United States Patent [19]
Huynh et al.

[11] Patent Number: 6,003,126
[45] Date of Patent: Dec. 14, 1999

[54] SPECIAL INSTRUCTION REGISTER INCLUDING ALLOCATION FIELD UTILIZED FOR TEMPORARY DESIGNATION OF PHYSICAL REGISTERS AS GENERAL REGISTERS

[75] Inventors: Dieu Huynh, Cary; Wan L. Leung, Raleigh, both of N.C.

[73] Assignee: International Business Machines, Armonk, N.Y.

[21] Appl. No.: 08/886,657

[22] Filed: Jul. 1, 1997

[51] Int. Cl.[6] ...................................................... G06F 9/34
[52] U.S. Cl. ............................ 712/217; 712/216; 712/23
[58] Field of Search ................................... 395/392, 393, 395/800, 23; 712/216, 217, 23

[56] References Cited

U.S. PATENT DOCUMENTS

| | | | |
|---|---|---|---|
| 4,574,349 | 3/1986 | Rechtschaffen | 711/154 |
| 4,623,962 | 11/1986 | Matsumoto et al. | 711/203 |
| 4,797,817 | 1/1989 | Nguyen et al. | 711/204 |
| 5,073,855 | 12/1991 | Staplin et al. | 712/217 |
| 5,150,468 | 9/1992 | Staplin et al. | 712/245 |
| 5,222,223 | 6/1993 | Webb et al. | 711/140 |
| 5,261,062 | 11/1993 | Sato | 395/705 |
| 5,293,631 | 3/1994 | Rau et al. | 395/707 |
| 5,630,149 | 5/1997 | Bluhm | 712/217 |
| 5,675,759 | 10/1997 | Shebanow et al. | 712/217 |
| 5,694,564 | 12/1997 | Alsup et al. | 712/216 |
| 5,778,245 | 7/1998 | Papworth et al. | 712/23 |
| 5,794,024 | 8/1998 | Golla et al. | 712/228 |

OTHER PUBLICATIONS

IBM Technical Disclosure Bulletin, "System Architecture for Efficient Pipeline Execution of List–Directed Repetitive Proceses and General–Purpose Emulation", vol. 28, No. 7, Dec. 1985, pp. 2928–2934.

*Primary Examiner*—Kenneth S. Kim
*Attorney, Agent, or Firm*—Lisa B. Yociss; Andrew J. Dillon

[57] ABSTRACT

A method and system in a superscalar data processing system are disclosed for the temporary designation of a physical register as a particular general register. The data processing system is capable of processing multiple instructions during a single clock cycle. Physical registers are established. None of the physical registers are initially designated as a particular general register. No general registers exist which are initially designated as particular general registers. For each of the multiple instructions, a determination is made as to whether the instruction is a load register instruction. If the instruction is a load register instruction, a determination is made as to whether the instruction is associated with a logical register name. Each one of the logical register names identifies a different general register. In response to the instruction being associated with a logical register name which identifies a particular general register, one of the physical registers is temporarily designated as the general register which is identified by the logical register name associated with the instruction. A special instruction register is established for each of the multiple instructions. Each special instruction register includes a plurality of fields including an allocation field. A first indicator is stored in the allocation field for special instruction registers associated with load instructions. A second indicator is stored in the allocation field for special instruction registers which are not associated with load instructions.

8 Claims, 15 Drawing Sheets

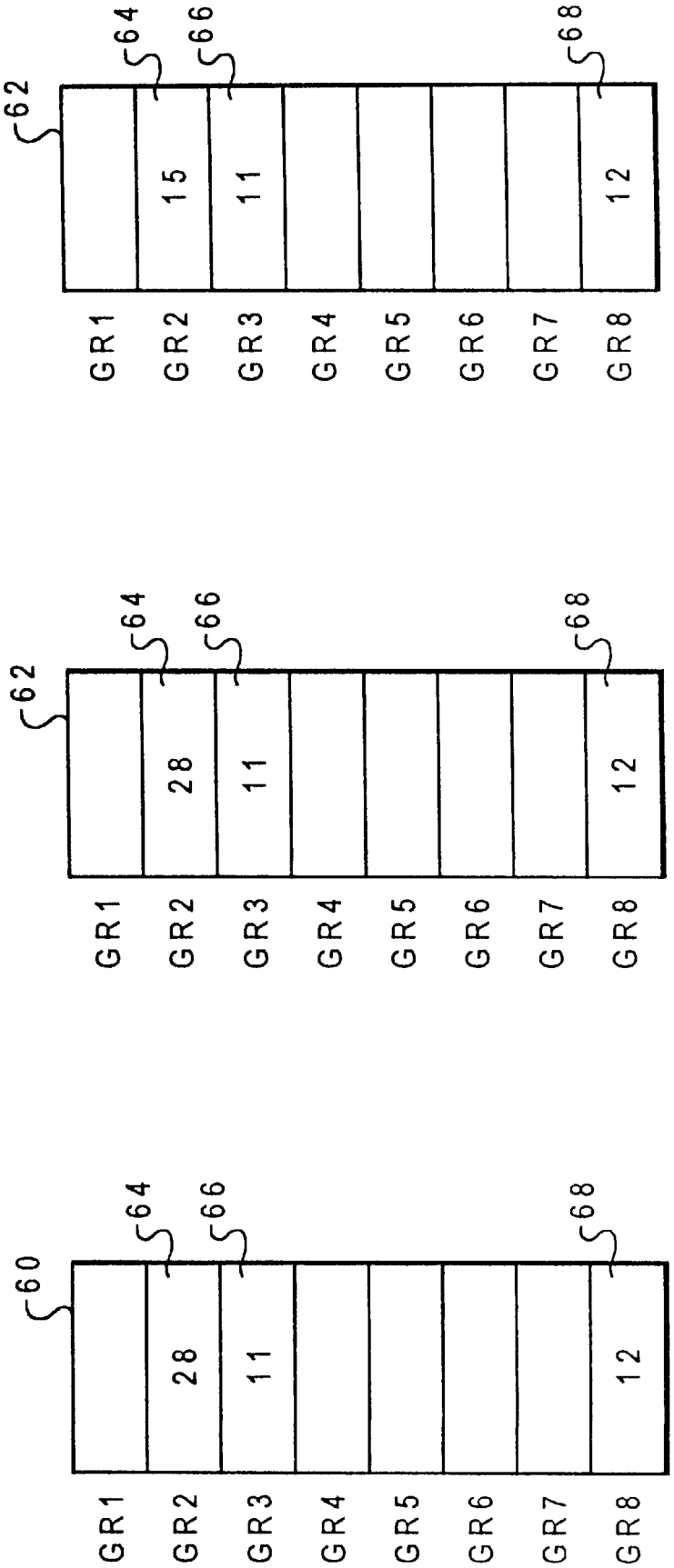

Fig. 9

| OP Code | Logical Reg. Name1 | Logical Reg. Name2 | Displ. Field | Allocate Field | Physical Reg. Field1 | Physical Reg. Field2 | Execute Unit Setup Field |
|---|---|---|---|---|---|---|---|
| 202 | 204 | 206 | 208 | 210 | 212 | 214 | 216 |

Fig. 10A

| Load | 2 | 8 | | 1 | 10 | 12 | |
|---|---|---|---|---|---|---|---|
| 202a | 204a | 206a | 208a | 210a | 212a | 214a | 216a |

Fig. 10B

| Load | 2 | 8 | | 1 | 28 | 12 | |
|---|---|---|---|---|---|---|---|
| 202b | 204b | 206b | 208b | 210b | 212b | 214b | 216b |

SPECIAL INSTRUCTION REGISTER INCLUDING ALLOCATION FIELD UTILIZED FOR TEMPORARY DESIGNATION OF PHYSICAL REGISTERS AS GENERAL REGISTERS

BACKGROUND OF THE INVENTION

1. Technical Field

The present invention relates to data processing systems, and in particular to the efficient management of a plurality of physical registers in a superscalar data processing system. Still more particularly, the present invention relates to a method and system in a superscalar data processing system for the temporary designation of one of a plurality of physical registers as a general register, wherein none of the physical registers were initially designated as a general register.

2. Description of the Related Art

A superscalar data processing system is a data processing system which includes a microprocessor architecture which is capable of executing multiple instructions per clock cycle. In order to execute multiple instructions per clock cycle, multiple independent functional units that can execute concurrently are required. Instructions are first fetched and then decoded. The overlap of the fetching and decoding of one instruction with the execution of a second instruction is called pipelining. In pipelined superscalar data processing systems, care must be taken to avoid dependencies where multiple instructions are fetched, decoded, and executed in a single cycle.

Software, written to load, store, and perform other operations, utilizes logical register names. These logical register names identify particular general registers. Typically, there are eight general registers which may be identified by software. In known systems, general purpose architectural registers, also called general registers, exist separate and apart from other registers which may also be included such as special purpose registers, and rename registers. These general registers are initially associated with a particular logical register name.

For example, one of the general purpose registers may be designated as general register 2 and be associated with a logical register name of "2". A typical software instruction may attempt to load data into general register 2. This instruction may be written: LOAD 2,data1. When processing this instruction, a copy of the data stored in storage location data1 will be loaded into the general register designated as general register 2. In such systems, any time an instruction is associated with a logical register name of "2", it will utilize the general register designated as general register 2.

Each general register included in these systems is designated as a particular general register. Often there may be eight general registers in a system. In this case, the general registers may be designated as general register 1 through general register 8. These general register designations exist in hardware and are therefore determined prior to the system ever being powered on. These designations never change. A general register designated as general register 1 will always be designated as general register 1. Further, no other general register can ever be designated as general register 1.

When multiple instructions are to be processed during a single clock cycle, a conflict may exist when two or more of these instructions attempt to utilize the same general register. For example, the following instruction sequence may need to be concurrently processed:

Instruction N1: LOAD 2, data1
Instruction N2: ADD REG 2,3
Instruction N3: STORE 2, temp
Instruction N4: LOAD 2, data2

A conflict arises during scheduling of these instructions because both instructions N1 and N4 load different data into general register 2. The instructions may be scheduled such that instruction N4 destroys the result from instruction N2 before instruction N3 had a chance to put the result into storage location "temp".

Therefore a need exists for a method and system in a superscalar data processing system for temporarily designating one of a plurality of physical registers as a general register, where none of the physical registers were initially designated as a general register.

SUMMARY OF THE INVENTION

It is therefore one object of the present invention to provide an improved data processing system.

It is another object of the present invention to provide a method and system for the efficient management of a plurality of physical registers in a superscalar data processing system.

It is yet another object of the present invention to provide a method and system in a superscalar data processing system for the temporary designation of one of a plurality of physical registers as a general register, wherein none of the physical registers were initially designated as a general register.

The foregoing objects are achieved as is now described. A method and system in a superscalar data processing system are disclosed for the temporary designation of a physical register as a particular general register. The data processing system is capable of processing multiple instructions during a single clock cycle. Physical registers are established. None of the physical registers are initially designated as a particular general register. No general registers exist which are initially designated as particular general registers. For each of the multiple instructions, a determination is made as to whether the instruction is associated with a logical register name. Each one of the logical register names identifies a different general register. In response to the instruction being associated with a logical register name which identifies a particular general register, one of the physical registers is temporarily designated as the general register which is identified by the logical register name associated with the instruction.

The above as well as additional objectives, features, and advantages of the illustrative embodiment will become apparent in the following detailed written description.

BRIEF DESCRIPTION OF THE DRAWINGS

The novel features are set forth in the appended claims. The present invention itself, however, as well as a preferred mode of use, further objectives and advantages thereof, will best be understood by reference to the following detailed description of the preferred embodiment when read in conjunction with the accompanying drawings, wherein:

FIG. 4 illustrates a pictorial representation of an allocation stage table 60 in accordance with the method and system of the present invention which includes a plurality of fields, each associated with a different logical register name which identifies a particular general register;

FIGS. 5a–5b each depict a pictorial representation of an execution stage table 62 in accordance with the method and system of the present invention which includes a plurality of fields, each associated with a different logical register name which identifies a particular general register;

FIG. 9 depicts a pictorial representation of a special instruction register 200 and its associated fields in accordance with the method and system of the present invention;

FIGS. 10a and 10b each illustrate a pictorial representation of a special instruction register which is associated with an instruction and its associated fields in accordance with the method and system of the present invention;

DETAILED DESCRIPTION OF PREFERRED EMBODIMENT

An exemplary embodiment of the present invention and its advantages are better understood by referring to FIGS. 1–14 of the drawings, like numerals being used for like and corresponding parts of the accompanying drawings.

Figure 1:
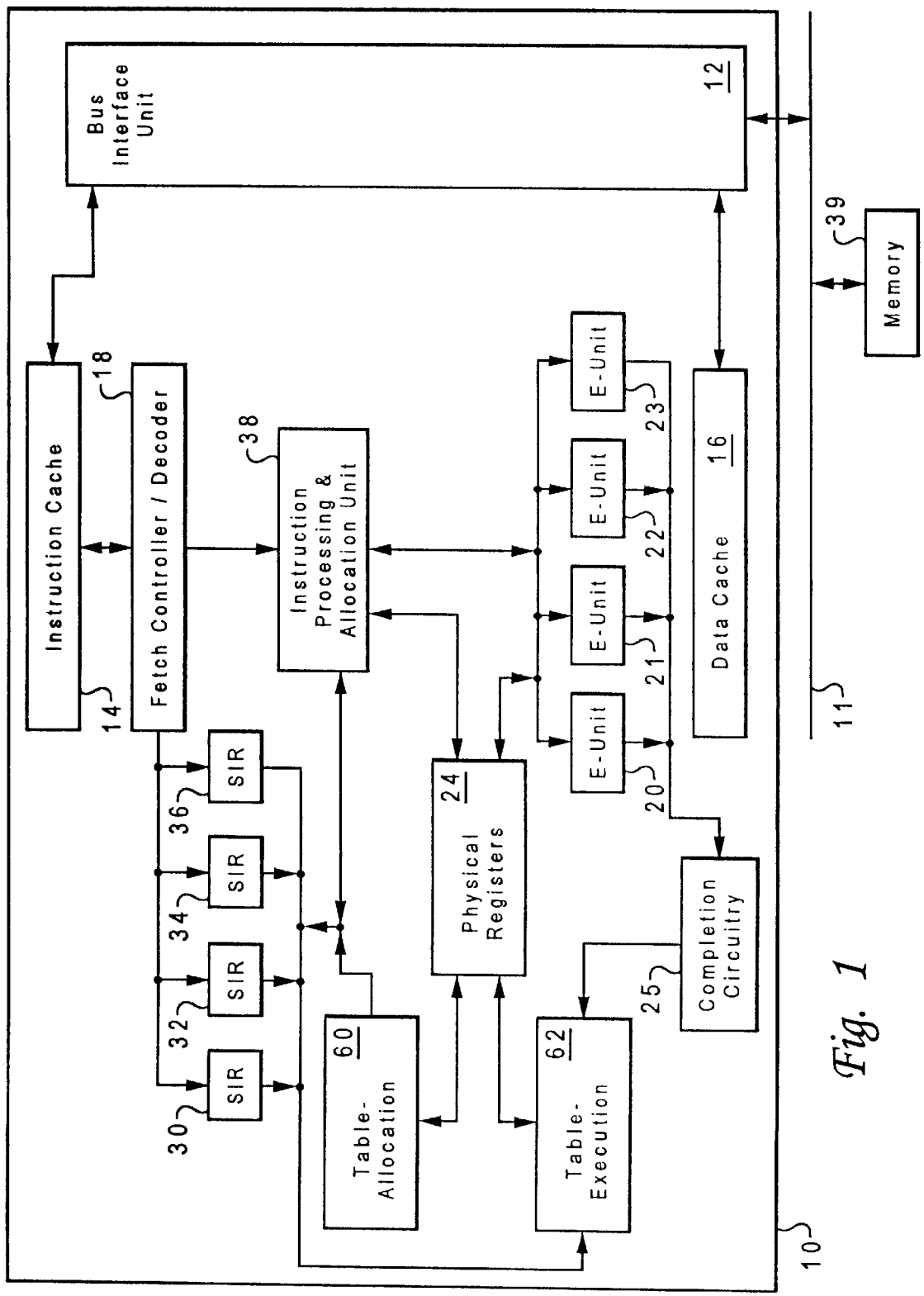
FIG. 1 depicts a high level block diagram of a superscalar data processing system 10 which may be utilized to implement the method and system of the present invention.

FIG. 1 is a block diagram of a processor 10 system for processing information according to the preferred embodiment. In the preferred embodiment, processor 10 is a single integrated circuit superscalar microprocessor. Accordingly, as discussed further herein below, processor 10 includes various units, registers, buffers, memories, and other sections, all of which are formed by integrated circuitry. Also, in the preferred embodiment, processor 10 operates according to reduced instruction set computer ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a fetch controller and decoder 18. In response to such instructions from instruction cache 14, fetch controller and decoder 18 selectively outputs instructions to other execution circuitry of processor 10.

In fetch controller and decoder 18, in the preferred embodiment the execution circuitry of processor 10 includes multiple execution units, such as execution units 20, 21, 22, and 23. Execution units 20, 21, 22, and 23 input their source operand information from a plurality of physical registers 24. According to an important feature of the present invention, none of the physical registers 24 are initially designated as a particular general register. No general registers exist which are initially designated as particular general registers.

When processor 10 is initially powered up, physical registers 24 each have an associated address. In a preferred embodiment, physical registers 24 include 32 separate registers. Therefore, physical registers 24 may have addresses 1–32. Those skilled in the art will recognize that physical registers 24 may include any number of physical registers.

In response to a Load instruction, information is input from data cache 16 and eventually copied to a selected one of physical registers 24. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, information is input from a selected one of physical registers 24 and copies such information to data cache 16.

Processor 10 achieves high performance by processing multiple instructions simultaneously at various ones of execution units 20, 21, 22, and 23. Accordingly, each instruction is processed as a sequence of stages, each being executable in parallel with stages of other instructions. Such a technique is called "pipelining". In a significant aspect of the illustrative embodiment, an instruction is normally processed in six or more stages, namely fetch, decode, dispatch, execute, and completion.

In the fetch stage, fetch controller and decoder 18 selectively inputs (from instructions cache 14) one or more instructions from one or more memory addresses and decodes up to four fetched instructions. These decoded instructions are stored in special instruction registers (SIR) 30, 32, 34, and 36.

In the dispatch stage, instruction processor and allocation unit 38 preprocesses and selectively dispatches up to four decoded instructions to selected ones of execution units 20, 21, 22, and 23. In the dispatch stage, operand information is supplied to the selected execution units for dispatched instructions. Processor 10 dispatches instructions in order of their programmed sequence.

In the execute stage, execution units 20, 21, 22, and 23 execute their dispatched instructions and output results (destination operand information) of their operations for storage at selected entries in physical registers 24. In this manner, processor 10 is able to execute instructions out-of-order relative to their programmed sequence.

In the completion stage, completion circuitry 25 is utilized so that the instructions are completed in their programmed order. When completion circuitry 25 receives a complete signal from each execution unit 20, 21, 22, and 23, completion circuitry 25 then signals execution table 62 to update execution table 62 to reflect which physical register is associated with a logical register name. The data or arithmetic result associated with each physical register which was temporarily assigned for execution has already been updated and stored into the physical register. In this manner, the writeback of the data has already been completed. A traditional writeback to general register stage is therefore unnecessary.

In the preferred embodiment, each instruction requires one machine cycle to complete each of the stages of instruction processing. Nevertheless, some instructions (e.g., complex fixed point instructions) may require more than one cycle. Accordingly, a variable delay may occur between a particular instruction's execution and completion stages in response to the variation in time required for completion of preceding instructions.

Superscalar data processing system 10 may concurrently process multiple instructions per clock cycle. For purposes of this specification, superscalar data processing system 10 may process up to four (4) instructions per clock cycle. Those skilled in the art will recognize that superscalar data processing system 10 may concurrently process any number of instructions per clock cycle. The multiple instructions may include a particular type of instruction.

In a preferred embodiment, the particular type of instruction is an instruction which loads data into a general register. Therefore, this type of instruction is associated with a logical register name which identifies a particular general register. For example, "LOAD 2, data 1" is an example of a particular type of instruction which loads data from a storage location identified by a base register plus a displacement indicated by "data 1" into general register 2. In accordance with the method and system of the present invention, none of physical registers 24 are initially designated as general register 2. No other registers exist within processor 10 which are initially designated or identified as general registers. Therefore, prior to processing this instruction, there is no general register 2. As will be described in more detail below, when "LOAD 2, data 1" is fetched, one of the physical registers is temporarily designated as general register 2, and a copy of the data stored in storage location "data 1" is stored into that physical register. The particular physical register which is designated as general register 2 may be any one of physical registers 24. That particular physical register will remain designated as general register 2 until a subsequent LOAD instruction attempts to load data into general register 2. When a subsequent instruction is fetched which needs to load data, for example data from a storage location identified by a base plus a displacement indicated by "data 2", into general register 2, a different one of physical registers 24 is associated with this subsequent instruction. The data associated with this subsequent instruction is loaded into the different one of physical registers 24. Until this instruction has completed execution and been retired, physical registers 24 will contain a copy of the data stored in storage location "data 1" and a copy of the data stored in storage location "data 2", each in a different physical register.

Figure 2:
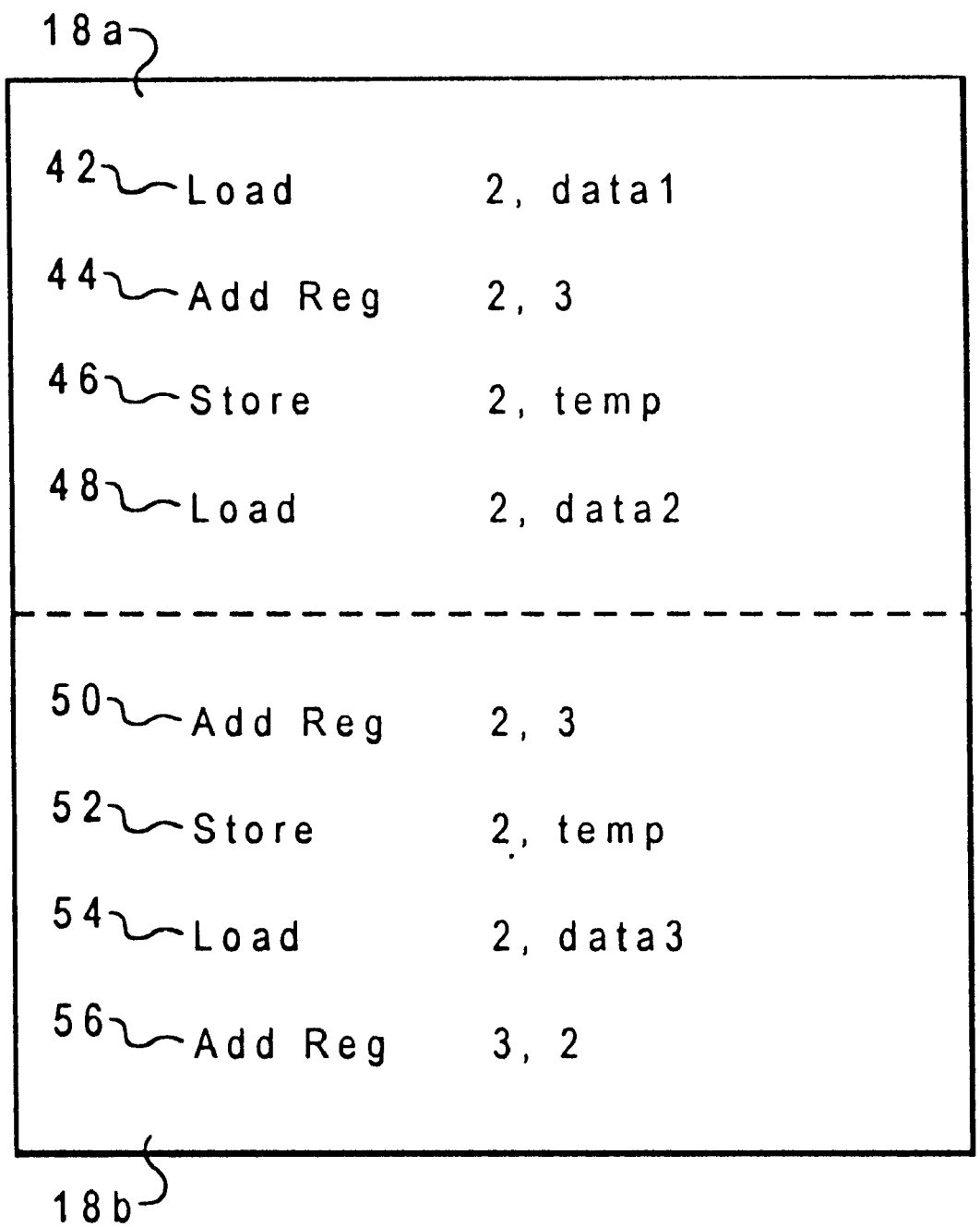
FIG. 2 illustrates a pictorial representation of the contents of fetch control and decoder 18 at two diffe ent clock cycles in accordance with the method and system of the present invention.

FIG. 2 is a pictorial representation of the contents of fetch control and decoder 18 at two different clock cycles in accordance with the method and system of the present invention. The contents 18a of fetch control and decoder 18 at a first clock include instructions 42, 44, 46, and 48.

The contents 18b of fetch control and decoder 18 at a second clock cycle include instructions 50, 52, 54, and 56. At the first cycle, four instructions are fetched and decoded. Instruction 42 is associated with a logical register name of "2" which identifies general register 2. Instruction 42, therefore, attempts to load a copy of the data stored in storage location "data 1" into general register 2. Instruction 44 is associated with a logical register name of "2" which identifies general register 2, and a logical register name of "3" which identifies general register 3. Instruction 44 attempts to add the contents of general register 2 to the contents of general register 3 and stores the result of the addition as contents into general register 2. Instruction 46 is associated with a logical register name of "2" and attempts to store the contents of general register 2 into a storage location associated with a "TEMP" logical name. Instruction 48 is associated with a logical register name of "2" which identifies general register 2, and attempts to load a copy of the data stored in storage location "data 2" into general register 2.

For this description, instruction N1 will be the first instruction decoded during a clock cycle, instruction N2 will be the second, Instruction N3 will be the third, and instruction N4 will be the fourth. Therefore, for the first clock cycle, instruction 42 is instruction N1, instruction 44 is instruction N2, instruction 46 is instruction N3, and instruction 48 is instruction N4. For the second clock cycle, instruction 50 is instruction N1, instruction 52 is instruction N2, instruction 54 is instruction N3, and instruction 56 is instruction N4.

At the second clock cycle, instruction 50 attempts to add the contents of general register 2 to the contents of general register 3 and stores the result of the addition as contents into general register 2. Instruction 52 is associated with a logical register name of "2" and attempts to store the contents of general register 2 into a storage location associated with a "TEMP" logical name. Instruction 54 is associated with a logical register name of "2" which identifies general register 2, and attempts to load a copy of the data stored in storage location "data 3" into general register 2. Instruction 56 attempts to add the contents of general register 2 to the contents of general register 3 and stores the result of the addition as contents into general register 2.

A conflict may arise, for example, during the first clock cycle during scheduling of these instructions because both instructions 42 and 48 load data into general register 2. The instructions may be scheduled such that instruction 48 destroys the result from instruction 46 before instruction 46 had a chance to put the result into storage location "temp".

FIGS. 3a–3e each depict a pictorial representation of physical registers 24 where some of physical registers 24 are temporarily designated as general registers in accordance with the method and system of the present invention. For purposes of illustration only, physical registers 24 include 32 different registers.

After an instruction is fetched and decoded, if the instruction is a LOAD register instruction, it is associated with one of the physical registers 24. The instruction is associated with any one of the physical registers which are free, i.e. not associated with any other instruction. Data which may be associated with the instruction is then stored in the physical register which is now associated with the instruction. For this example, instruction 42 has been associated with physical register 10, and a copy of the data stored in storage location "data 1" has been stored in physical register 10. Instruction 48 has been associated with physical register 28, and a copy of the data stored in storage location "data 2" has been stored in physical register 28. Instruction 54 has been associated with physical register 15, and a copy of the data stored in storage location "data 3" has been stored in physical register 15.

Figure 3C:
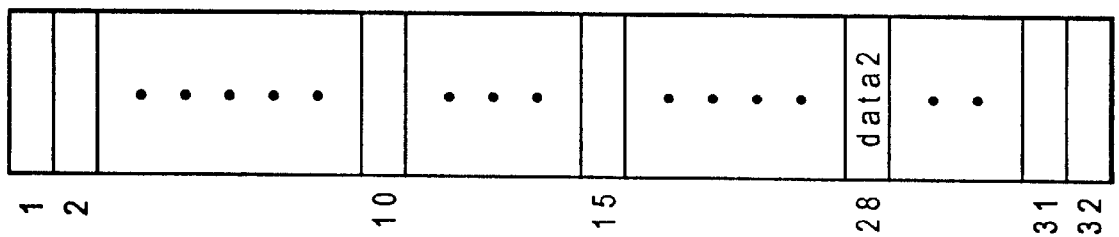
FIGS. 3a, 3b, 3c, 3d and 3e each depict a pictorial representation of physical registers 24 where some of physical registers 24 have been temporarily designated as general registers in accordance with the method and system of the present invention.
Figure 3B:
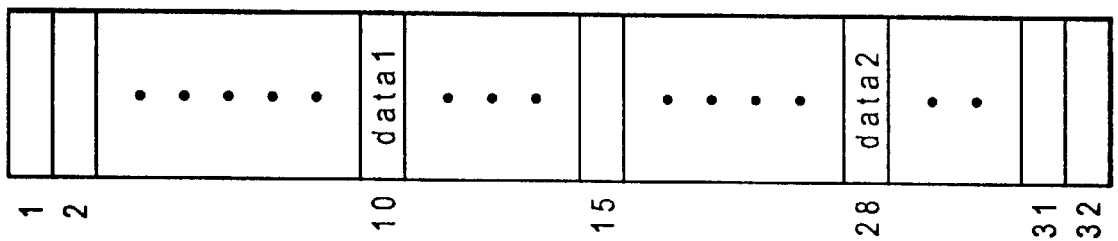
Figure 3A:
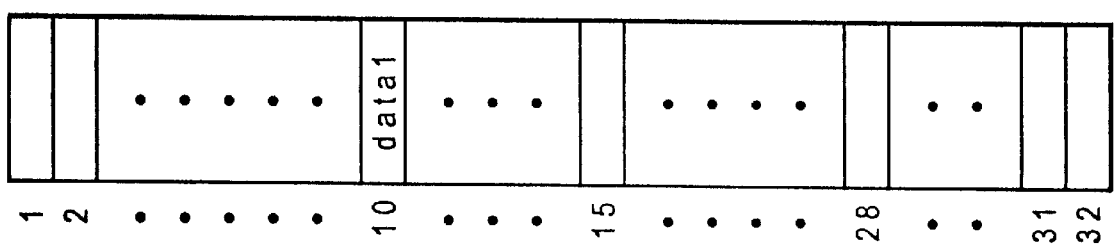

FIG. 3a is a pictorial representation of physical registers 24 at a time during the processing of the first clock cycle after instruction 42 has been associated with a physical register and before instruction 44 has been associated with a physical register. FIG. 3a illustrates that a copy of the data stored in data location "data 1" had been stored in physical register 10. Because instruction 42 is associated with a logical register name of "2" which identifies general register 2, physical register 10 is now temporarily designated as general register 2.

FIG. 3b is a pictorial representation of physical registers 24 at a time during the processing of the first clock cycle after instruction 48 has been associated with a physical register and before the completion of the first clock cycle and before instruction 54 has been associated with a physical register. FIG. 3b illustrates that the copy of the data stored in storage location "data 2" had been stored in physical register 28. Because instruction 48 is associated with a logical register name of "2" which identifies general register 2, physical register 28 is now also temporarily designated as general register 2. Because these instructions have not completed execution and been retired, the copy of the data stored in storage location "data 1" remains stored in physical register 10 which remains associated with instruction 42 and is still temporarily designated as general register 2. Both physical registers 10 and 28 are now temporarily designated as general register 2.

FIG. 3c is a pictorial representation of physical registers 24 after the first clock cycle after instructions 42, 44, 46, and 48 have been completed and retired, and before processing of the second clock cycle. At this time physical register 28 remains designated as general register 2 and includes data which is valid data for general register 2. Because physical register 10 had been associated with a previous load instruction and contained temporary data, physical register 10 contains residual data from prior operations when instructions 42, 44, 46, and 48 have been completed and retired. Physical register 10 may be freed for reassignment when the completion stage is completed, and instructions 42, 44, 46, and 48 are retired.

Figure 3D:
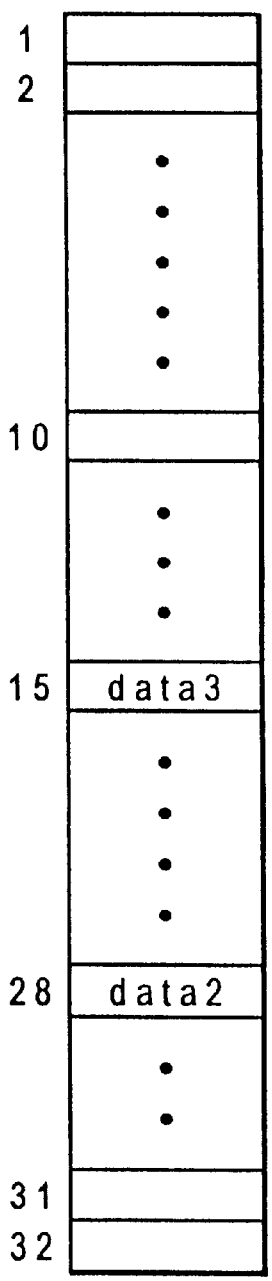

FIG. 3d is a pictorial representation of physical registers 24 at a time during the second clock cycle after instruction 54 has been associated with a physical register and before the completion of the second clock cycle. Instruction 54 has been associated with physical register 15. FIG. 3d illustrates that a copy of the data stored in storage location "data 3" had been stored in physical register 15. Instructions 50 and 52 are each associated with a different special instruction register. Instruction 50 is associated with a logical register name of "2" and logical register name of "3". However, instruction 50 is not a load register instruction. Therefore, any previous associations between logical register names of physical registers is not altered. However, instruction 50 will utilize these previous associations in order to complete execution of the instruction. In a similar manner, instruction 52 is associated with a logical register name of "2". Instruction 52 is not a load register instruction. Any previous associations between logical register names of physical registers is not altered by this instruction. Instruction 52 will utilize these previous associations in order to complete execution of the instruction.

Because instruction 54 is a load register instruction and is associated with a logical register name of "2" which identifies general register 2, physical register 15 is temporarily designated as general register 2. At this time physical register 28 is also temporarily designated as general register 2 and is associated with instruction 48 and includes a copy of the data stored in storage location "data 2".

Figure 3E:
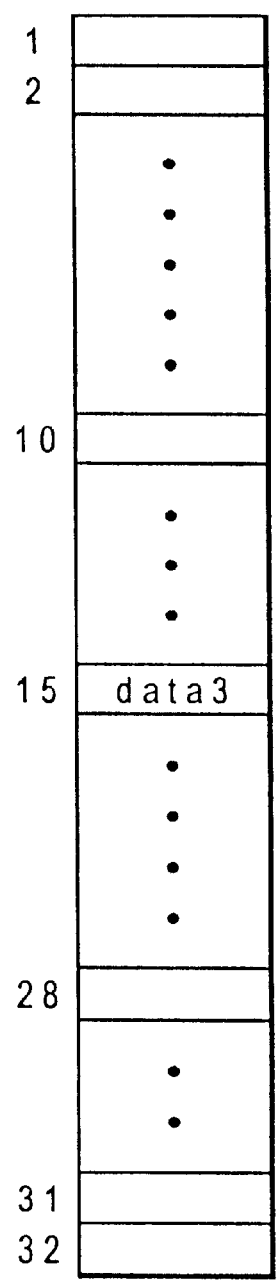

FIG. 3e is a pictorial representation of physical registers 24 after the completion of the second clock cycle after instructions 50, 52, 54, and 56 have been completed and retired and before processing of a third clock cycle. At this time physical register 15 remains designated as general register 2 and includes a copy of the data stored in storage location "data 3" which is now valid data for general register 2. Because physical register 28 had been associated with a previous load instruction and contained temporary data, physical register 28 contains residual data from prior operations when instructions 50, 52, 54, and 56 have been completed and retired. Physical register 28 may be freed for reassignment when the completion stage is completed and instructions 50, 52, 54, and 56 have been retired.

As shown by this example, processor 10 does not initially include any registers which have been designated as general registers. None of physical registers 24 are initially designated as a general register. As instructions are fetched, decoded, and executed, any number of physical registers 24 are temporarily designated and utilized as general registers. During processing of instructions in one clock cycle, physical registers 24 may include more then one register which is temporarily designated as a general register.

FIG. 4 illustrates a pictorial representation of an allocation table 60 in accordance with the method and system of the present invention which includes a plurality of fields, each associated with a different logical register name which identifies a particular general register. FIG. 4 illustrates table 60 at the end of the allocation phase of the first clock cycle.

Table 60 includes a plurality of fields. Each field is associated with a different logical register name which identifies a particular general register. For example, field 64 is associated with a logical register name of "2" which identifies general register 2. Field 66 is associated with a logical register name of "3" which identifies general register 3. Field 68 is associated with logical register name 12 which identifies general register 12.

Figure 12:
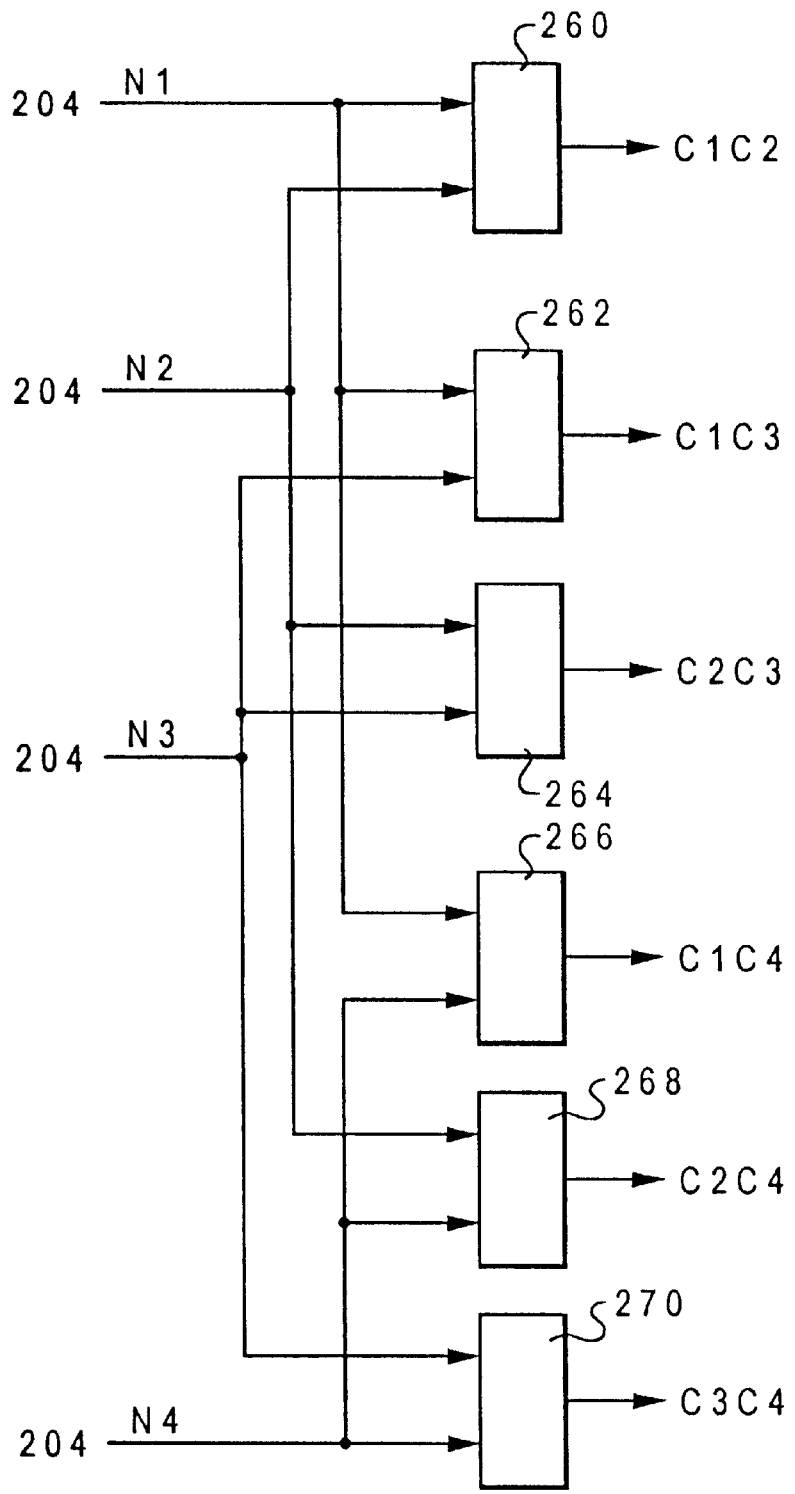
FIG. 12 illustrates a pictorial representation of a plurality of compare circuits utilized to compare the logical register names associated with each of the multiple instructions to be concurrently processed in accordance with the method and system of the present invention.
Figure 13:
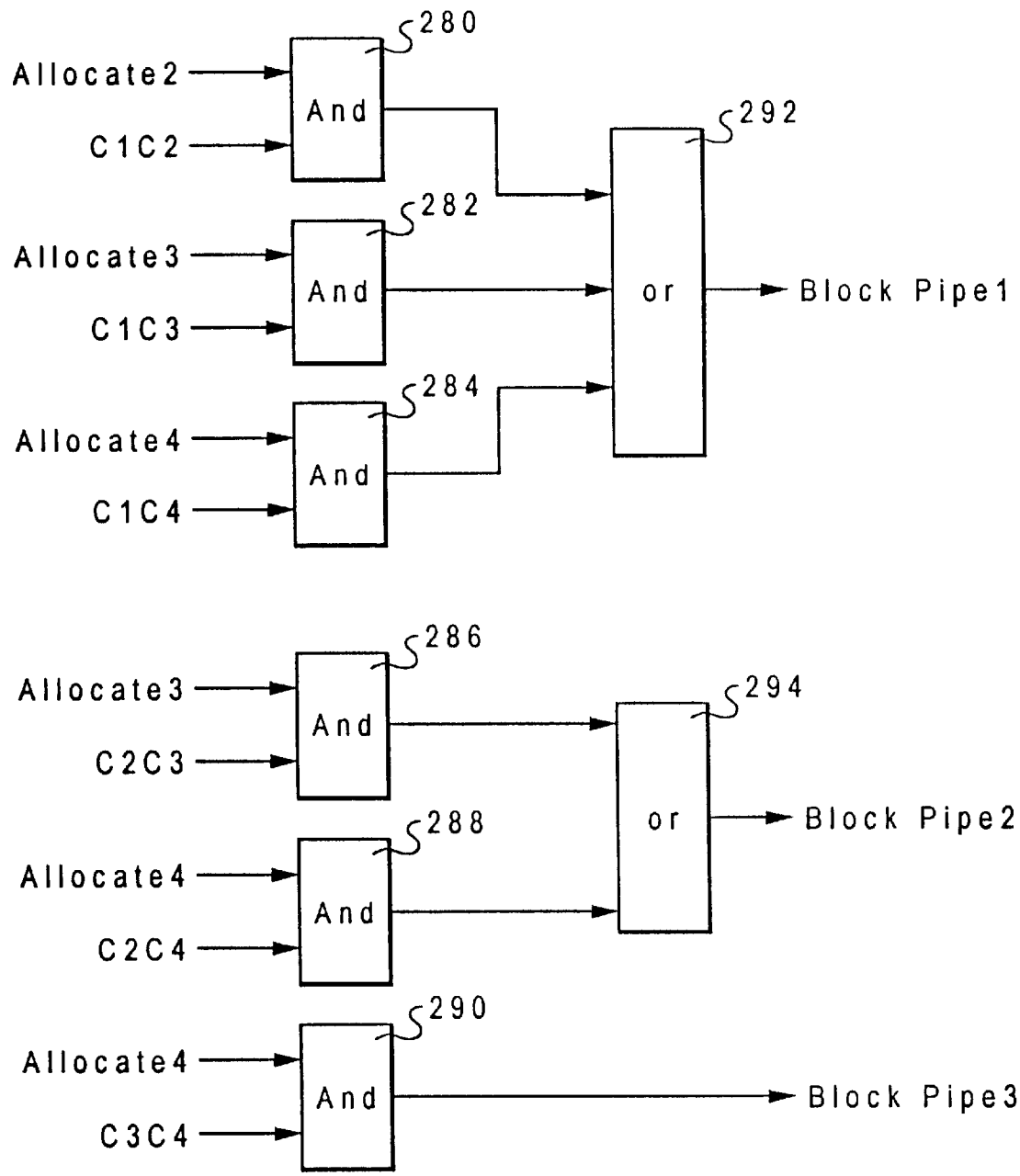
FIG. 13 depicts a pictorial representation of a plurality of circuits to be utilized during an updating of tables 60 and 62 in accordance with the method and system of the present invention.
Figure 14:
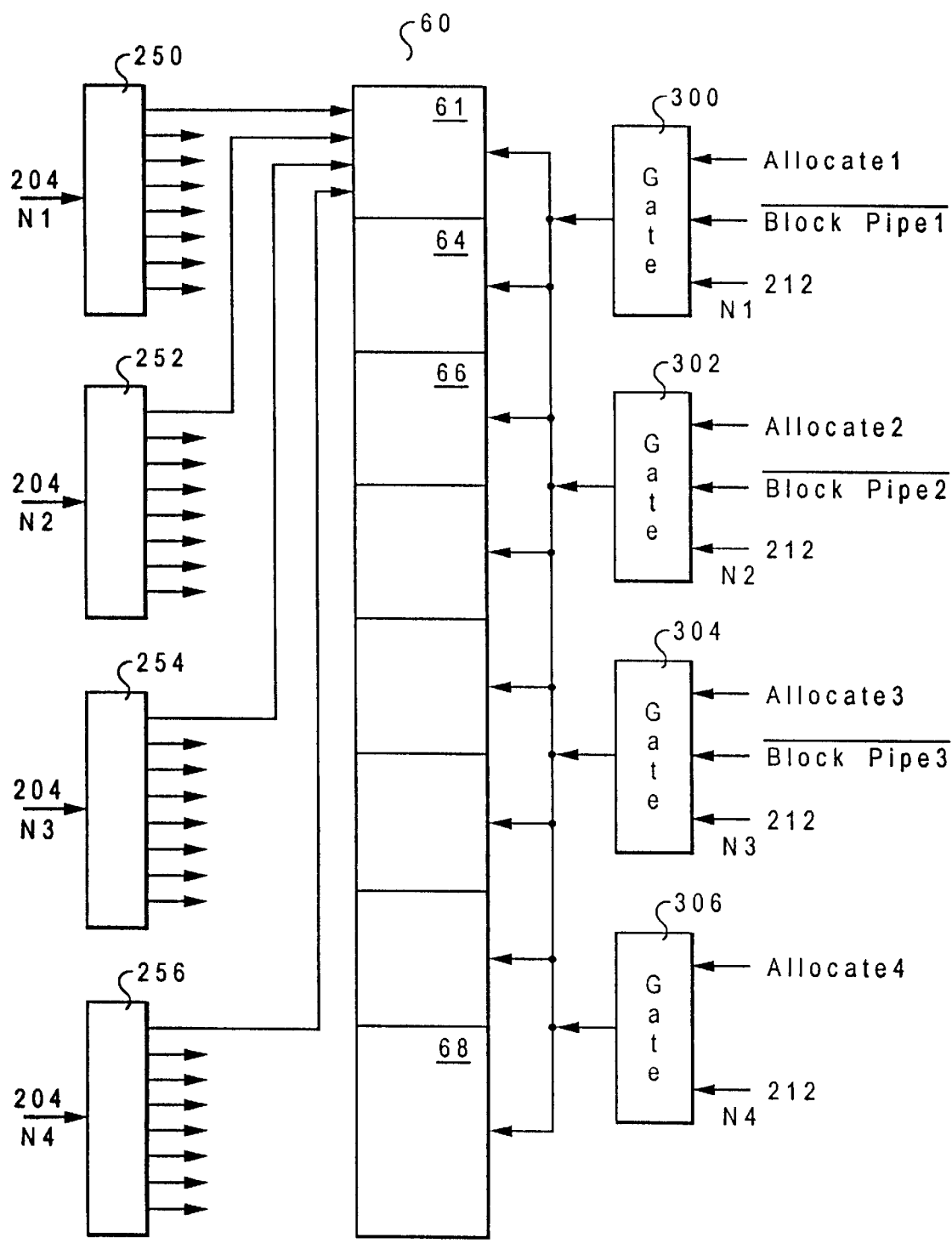
FIG. 14 illustrates a pictorial representation of a plurality of gates to be utilized during an updating of tables 60 and 62 in accordance with the method and system of the present invention.

Table 60 is updated at the end of the allocation phase of each clock cycle. A preferred system for updating table 60 is shown in FIGS. 12–14. For each load register instruction, a free physical register is associated with the load register instruction. This association is maintained in the special instruction register associated with this instruction. Once the allocation phase is complete, table 60 is updated by inserting the address of the physical register into a field within table 60 associated with the general register which is identified by the logical register name for the last load register instruction to be allocated.

During the allocation phase instruction 42 is decoded. Because it is a "load" register instruction, it has been associated with a physical register having an address of physical register 10. Instruction 42 is associated with a logical register name of "2" which identifies a general register 2.

During a previous cycle of the pipeline, a load instruction was decoded which was associated with a logical register name of "3" which identified general register 3. That instruction was then associated with physical register 11. Field 66 is associated with a logical register name of "3" which identifies general register 3. The address of the physical register was stored in field 66. Table 60 indicates that the data for general register 3 is stored in physical register 11. The data still stored in physical register 11 is considered to be residual data left in the register from a previous cycle which is still valid. In subsequent instructions which need to read general register 3 will be able to obtain the correct value of general register 3 by reading the data stored in physical register 11.

Also during a previous cycle of the pipeline, a load instruction was decoded which was associated with a logical register name of "8" which identified general register 8. That instruction was then associated with physical register 12. Field 68 is associated with a logical register name of "8" which identifies general register 8. The address of the physical register was stored in field 68. Table 60 indicates that the data for general register 8 is stored in physical register 12. The data still stored in physical register 12 is considered to be residual data left in the register from a previous cycle which is still valid. In subsequent instructions which need to read general register 8 will be able to obtain the correct value of general register 8 by reading the data stored in physical register 12.

Because instruction 48 is a load register instruction, it is associated with a free physical register during the allocation phase. A physical register having an address of physical register 28 is associated with instruction 48. Instruction 48 is associated with a logical register name of "2" which identifies a general register 2. This association between instruction 48 and physical register 2 is maintained in the special instruction register associated with instruction 48.

Since instruction 48 is the last load register instruction during this clock cycle, table 60 is updated to indicate that physical register 28 is temporarily designated as general register 2. Field 64 within table 60 is associated with a general register 2. Table 60 is updated by now inserting a "28" into field 64. Table 60, then, includes an indication of the association of physical registers with logical register names at the end of the allocation phase.

FIGS. 5a–5b each depict a pictorial representation of an execution stage table 62 in accordance with the method and system of the present invention which includes a plurality of fields, each associated with a different logical register name which identifies a particular general register. FIG. 5a is a pictorial representation of an execution table 62 at the completion of the third clock cycle. FIG. 5b is a pictorial representation of an execution table 62 at the completion of the fourth clock cycle.

Addresses are entered and updated in table 62 in the same manner as they are in table 60. However, table 62 follows the completion cycle, while table 60 follows the allocation cycle. Instructions are allocated, scheduled, and then executed. Therefore, if execution of all instructions are completed in one cycle, updates to table 62 will lag updates to table 60 by two cycles. Table 62 will be updated in the same way table 60 was updated two cycles after table 60 was updated. Updates to table 62 are utilized to free any temporarily allocated physical registers for reassignment. In this manner, in the event of interrupts or exceptions, the state of processor 10 may be recovered utilizing table 62. The following figures which describe reading and updating table 60 also describe the method and system for reading and updating table 62. It should be understood that table 62 will be identical to table 60, but will lag the updating of table 60 by the number of clock cycles necessary in a particular processor to complete processing of the multiple instructions.

Figure 6:
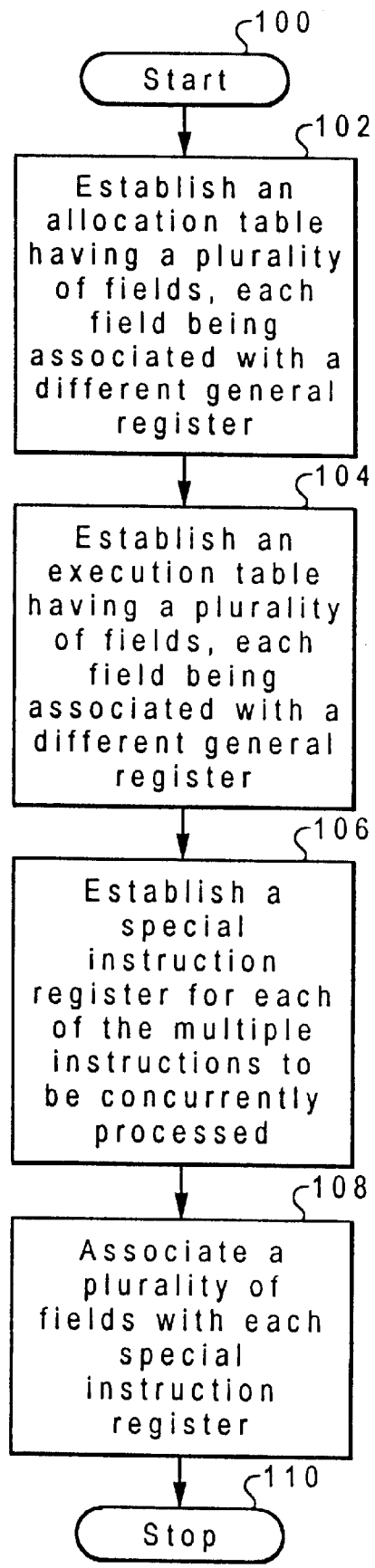
FIG. 6 is a high level flow chart depicting the establishment of an allocation table, an execution table, and a plurality of special instruction registers in accordance with the method and system of the present invention.

FIG. 6 is a high level flow chart depicting the establishment of an allocation table, an execution table, and a plurality of special instruction registers in accordance with the method and system of the present invention. The process starts as depicted at block 100 and thereafter passes to block 102 which illustrates the establishment of an allocation table 60 having a plurality of fields. Each of the fields is associated with a different general register. Next, block 104 depicts the establishment of an execution table 62 having a plurality of fields. Each of these fields is associated with a different general register. The process then passes to block 106 which illustrates the establishment of a special instruction register for each instruction to be concurrently processed. In the preferred embodiment, four instructions are concurrently executed. Therefore, there are four different special instruction registers (SIR's), one for each instruction. Next, block 108 depicts the association of a plurality of fields with each special instruction register. For example, each special instruction register will have associated with it a first and a second physical register fields. The address of a physical register will be placed in one of these fields. The process then terminates as depicted at block 110.

Figure 7A:
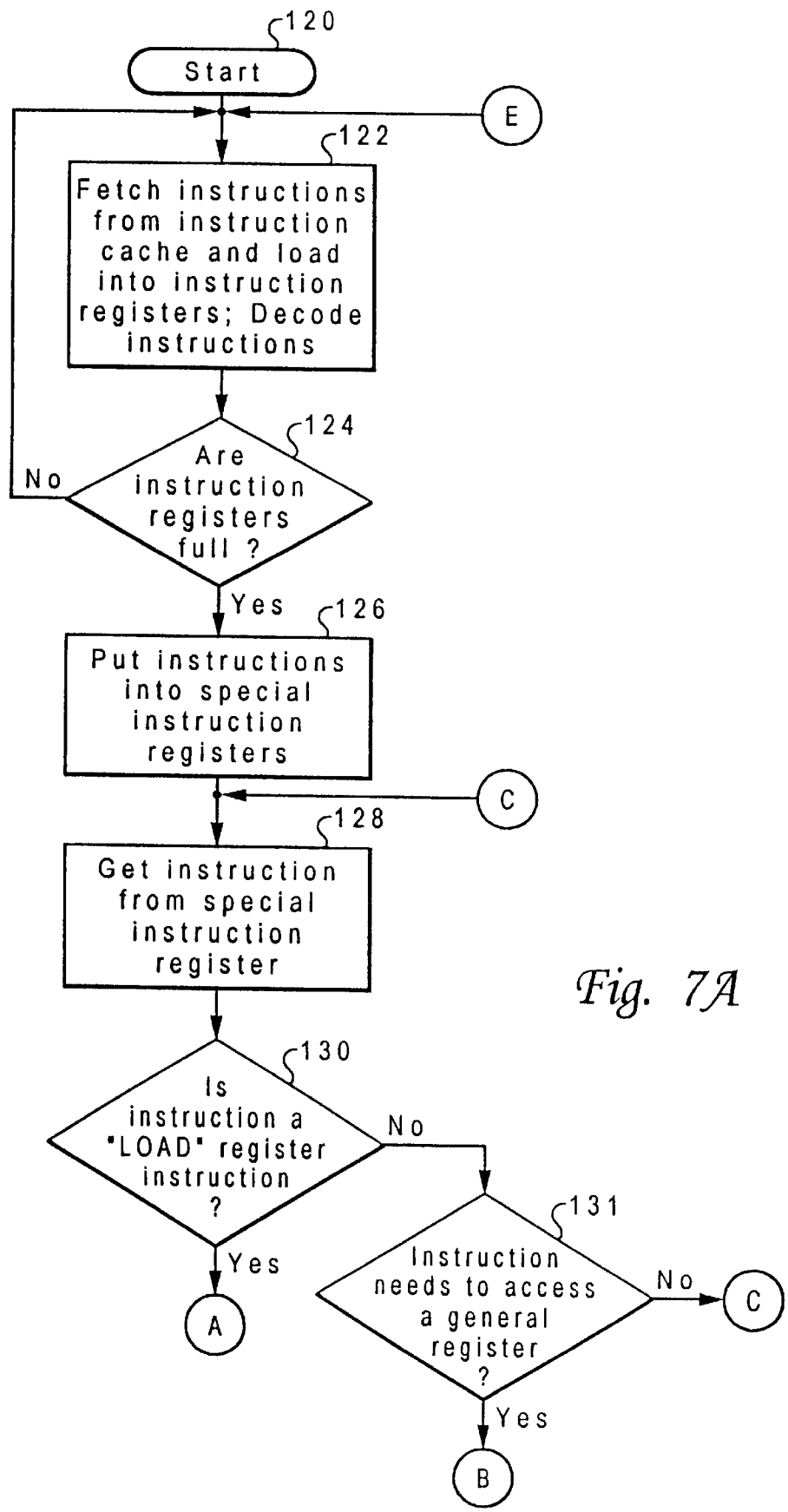
FIGS. 7a, 7b, and 7c together are a high level flow chart which illustrates the preprocessing and allocation of the multiple instructions to be concurrently processed by processor 10 in accordance with the method and system of the present invention.
Figure 7B:
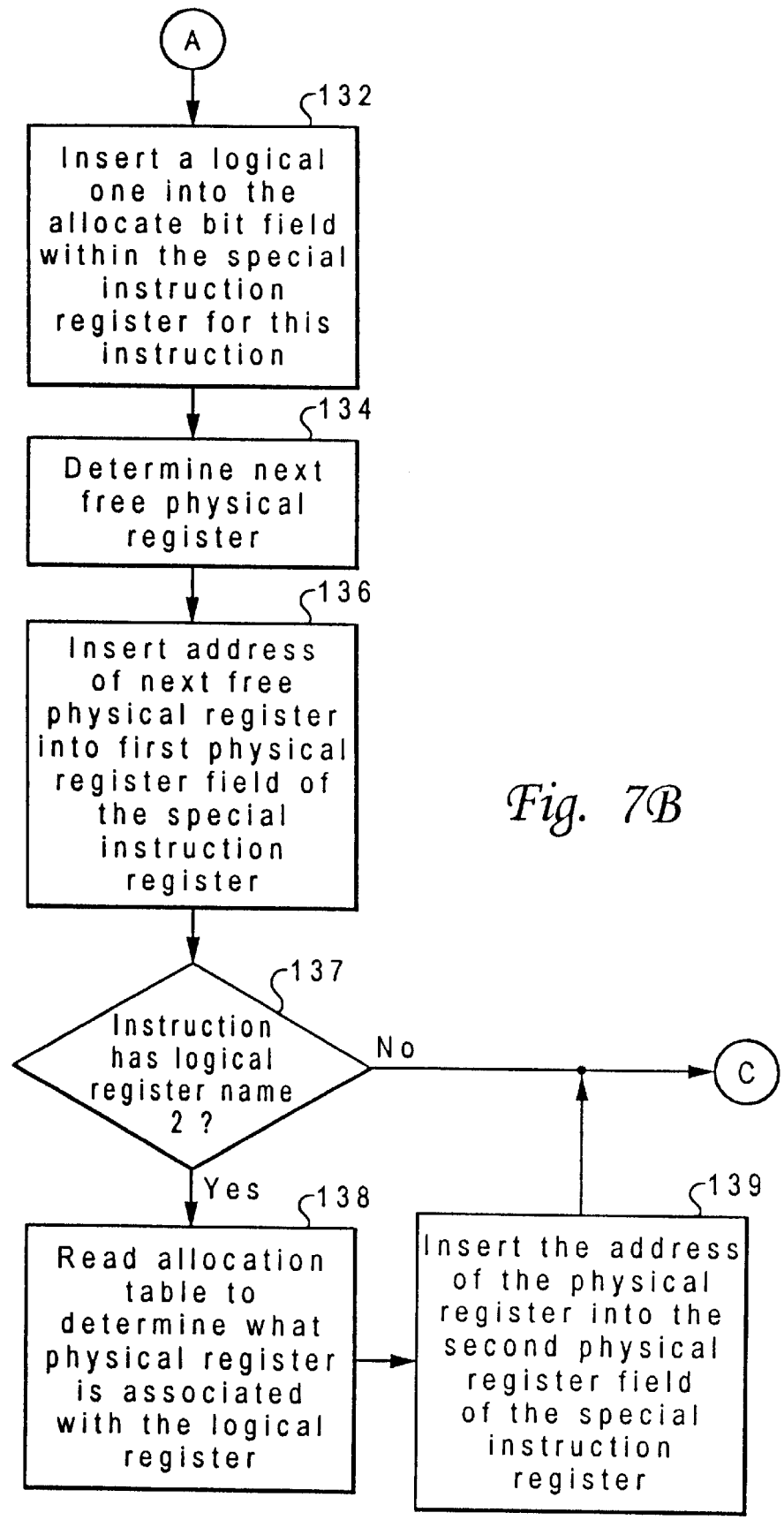
Figure 7C:
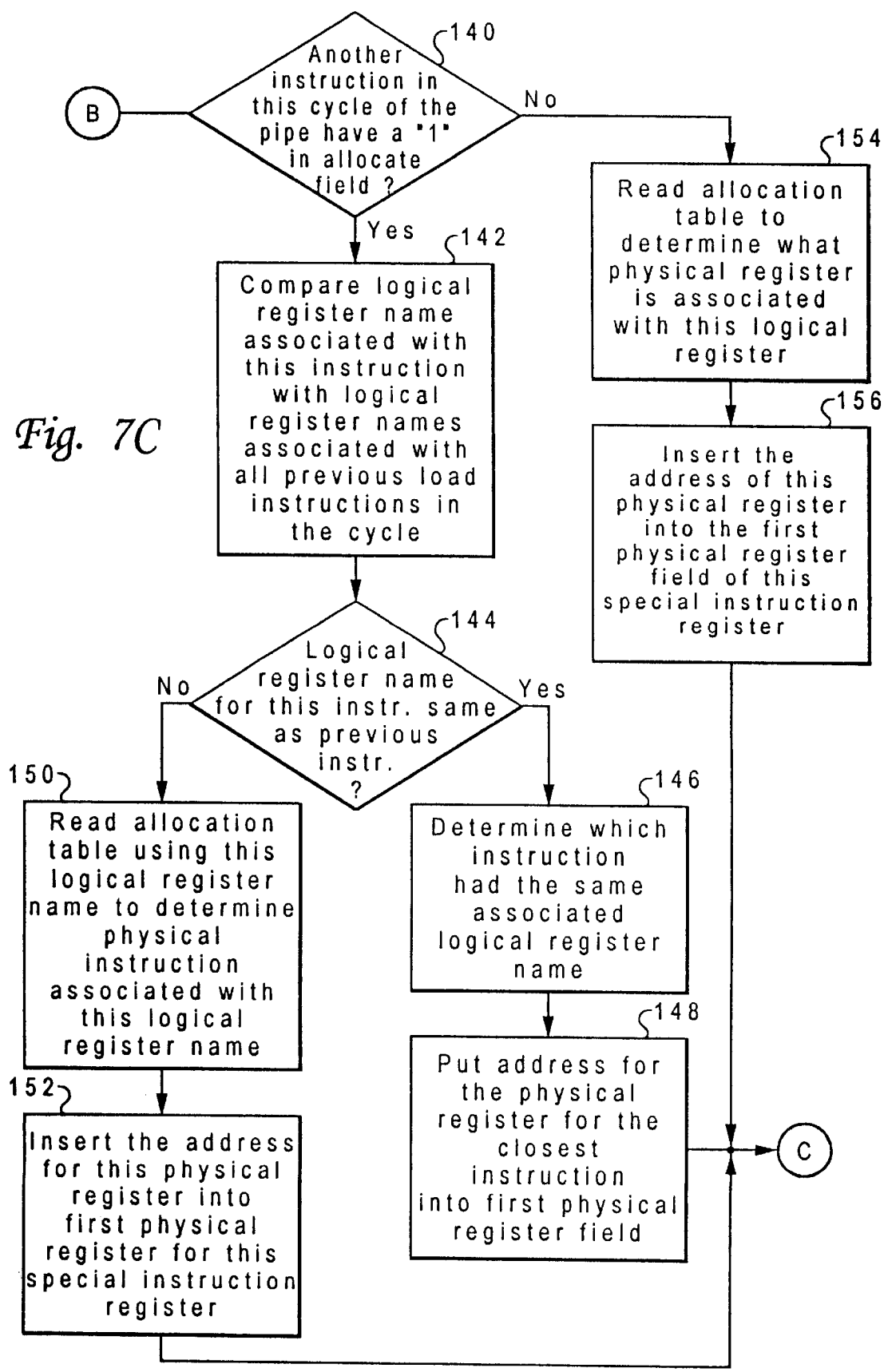

FIGS. 7a–7c together are a high level flow chart which illustrates the preprocessing and allocation of the multiple instructions to be concurrently processed by processor 10 in accordance with the method and system of the present invention. The process starts as depicted at block 120 and thereafter passes to block 122 which illustrates the fetching of the multiple instructions from the instruction cache and the loading of these instructions into instruction registers. The instructions are then decoded. Next, block 124 illustrates a determination of whether or not the instruction registers are full. If a determination is made that the instruction registers are not full, the process passes back to block 122. Referring again to block 124, if a determination is made that the instruction registers are full, the process passes to block 126 which depicts putting these decoded instructions into special instruction registers. Each decoded instruction is put into a separate special instruction register. Next, block 128 illustrates getting an instruction from its special instruction register. Thereafter, block 130 depicts a determination of whether or not the instruction is a particular type of instruction. In a preferred embodiment, the determination is made as to whether or not the instruction is a "LOAD" register instruction. If a determination is made that the instruction is a "LOAD" register instruction, the process passes to block 132 as depicted through connector A.

Block 132 illustrates the insertion of a logical one, "1", into an allocate bit field which is associated with the special instruction register for this instruction. Next, block 134 depicts the determination of a next free physical register. Block 136, then, illustrates the insertion of an address of the next free physical register into a first physical register field associated with the special instruction register for this instruction. The process then passes back to block 137 which illustrates a determination of whether or not the instruction has a second associated logical register name. If a determination is made that the instruction does not have a second associated logical register name, the process passes to block 128 as depicted through connector C.

Referring again to block 137, if a determination is made that the instruction does have an associated second logical register name, the process passes to block 138 which depicts the reading of the allocation table to determine which physical register is associated with the logical register name. Next, block 139 illustrates the insertion of the address of the physical register into the second physical field of the special instruction register. The process then passes to block 128 as depicted through connector C.

Referring again to block 130, if a determination is made that the instruction is not a "LOAD" register instruction, the process passes to block 131 which illustrates a determination of whether or not the instruction needs to access a general register. For example, instructions 44, 46, 50, 52, and 56 each need to access a general register. Each of these instructions will include a logical zero, "0", in the allocate field of the special instruction register associated with each of these instructions. If a determination is made that the instruction does not need to access a general register, the process passes back to block 128. If a determination is made that the instruction does need to access a general register, the process passes to block 140 as depicted through connector B. Block 140 illustrates a determination of whether or not any other special instruction registers have a logical one included in an allocate field associated with each special instruction register. For each "LOAD" register instruction, a logical one was inserted into the allocate field in the special instruction register for that instruction. If a determination is made that there is a special instruction register having a logical one included in its allocate field, the process passes to block 142 which depicts a comparison of the logical register name associated with the current instruction with the logical register name associated with the previous "LOAD" register instruction in this cycle. Thereafter, block 144 illustrates a determination of whether or not the logical register name associated with the current instruction is the same logical register name associated with a previous "LOAD" register instruction in this cycle. If a determination is made that the logical register name associated with the current instruction is the same logical register name associated with a previous "LOAD" register instruction in this cycle, the process passes to block 146 which illustrates a determination of which instruction had the same associated logical register name. Thereafter, block 148 depicts putting the address for the physical register for the closest instruction in the original programmed sequence into the first physical register field in the special instruction register for the current instruction. For example, instruction 46 is closer to instruction 48 than instruction 44. The process then passes back to block 128 as depicted through connector C.

Referring again to block 144, if a determination is made that the logical register name associated with the current instruction is the not same logical register name associated with any previous "LOAD" register instruction in this cycle, the process passes to block 150 which illustrates reading allocation table 60 using the logical register name associated with this instruction to determine the address of the physical instruction associated with this logical register name. Block 152, then, depicts the insertion of the address of this physical register into a first physical register for this special instruction register. The process then passes back to block 128 as depicted through connector C.

Referring again to block 140, if a determination is made that there is not another special instruction register having a logical one included in its allocate field, the process passes to block 154 which depicts reading allocation table 60 using the logical register name associated with this instruction to determine the address of the physical instruction associated with this logical register name. Block 156, then, depicts the insertion of the address of this physical register into a first physical register for this special instruction register. The process then passes back to block 128 as depicted through connector C.

Figure 8:
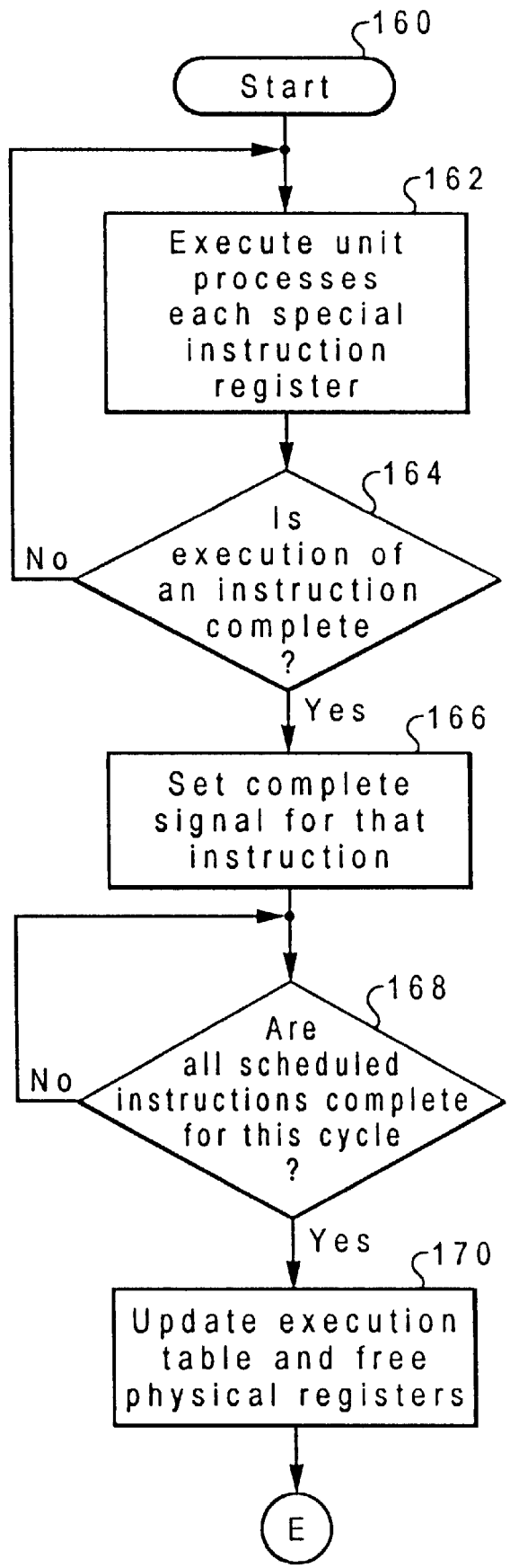
FIG. 8 is a high level flow chart depicting the execution of multiple instructions utilizing a plurality of special instruction registers to be concurrently processed by processor 10 in accordance with the method and system of the present invention.

FIG. 8 is a high level flow chart depicting the execution of multiple instructions to be concurrently processed by processor 10 in accordance with the method and system of the present invention. The process starts as depicted at block 160 and thereafter passes to block 162 which illustrates the execution of each special instruction register. Block 164, then depicts a determination of whether or not the execution of an instruction is complete. If a determination is made that the execution of an instruction is not complete, the process passes back to block 162. Referring again to block 164, if a determination is made that the execution of an instruction is complete, the process passes to block 166 which illustrates setting a complete signal for the completed instruction. Thereafter, block 168 depicts a determination of whether or not all scheduled instruction have completed execution for this cycle. If a determination is made that not all of the scheduled instructions have completed execution, the process passes back to block 168. Referring again to block 168, if a determination is made that all of the scheduled instructions have completed execution, the process passes to block 170 which illustrates the updating of execution table 62 and to free any temporarily assigned physical registers for reassignment. The process then passes back to block 122 as illustrated through connector E.

FIG. 9 is a pictorial representation of a special instruction register 200 and its associated fields in accordance with the method and system of the present invention. In a preferred embodiment, there are four separate special instruction registers. A different special instruction register is associated with each of the multiple instructions to be concurrently processed during a single clock cycle.

Field 202 includes the op code for the instruction associated with special instruction register 200. Field 204 includes a first logical register name which may be associated with the instruction. Field 206 includes a second logical register name which may be associated with the instruction. Field 208 includes a displacement associated with the instruction. Fields 202, 204, 206, and 208 are known in the art and are fields typically associated with a known load register instruction.

Special instruction register 200 also includes an allocate field 210, a first physical register field 212, a second physical register field 214, and an execute unit setup field 216. Fields 210, 212, 214, and 216 are not known in the art.

FIG. 10*a* is a pictorial representation of a special instruction register 220 which is associated with instruction 42 and its associated fields in accordance with the method and system of the present invention. The op code for a "LOAD" register instruction is associated with field 202*a*. Instruction 42 has an associated first logical register name of "2" which is associated with field 204*a*. Instruction 42 has an associated logical register name, and it is part of the base address field 206, added to the displacement field 208 to generate a complete storage address. Instruction 42 has an associated second logical register name "8" which is associated with field 206*a*. A logical one is associated with the allocate field for each "LOAD" instruction. Therefore, field 210*a* includes a "1". Instruction 42 has been associated with a physical register 10. The address of this physical register is associated with field 212*a*. Field 212*a* includes a "10". Instruction 42 has previously been associated with physical register 12 for its base register named 8. The address of this physical register is associated with field 214*a*.

FIG. 10*b* is a pictorial representation of a special instruction register 240 which is associated with instruction 48 and its associated fields in accordance with the method and system of the present invention. The op code for a "LOAD" instruction is associated with field 202b. Instruction 48 has an associated first logical register name of "2" which is associated with field 204b. Instruction 48 has an associated second logical register name "8" which is associated with field 206b. A logical one is associated with the allocate field for each "LOAD" instruction. Therefore, field 210b includes a "1". Instruction 48 has previously been associated with a physical register 28. The address of this physical register is associated with field 212b. Field 212b includes a "28". Instruction 48 has previously been associated with physical register 12 for its base register named 8. The address of this physical register is associated with field 214b.

Instructions which are not load register instructions, such as instructions 44, 46, 50, 52, and 56 are each associated with a special instruction register. For these instructions, allocate field 210 will include a logical zero. The remaining fields will be utilized to store information as described above. Instruction 42, for example, is associated with a logical register name of "2" and "3". Therefore, the special instruction register which stores instruction 42 will include a first logical register name in field 204 with its associated physical register in field 212, and will include a second logical register name in field 206 with its associated physical register in field 214.

Figure 11:
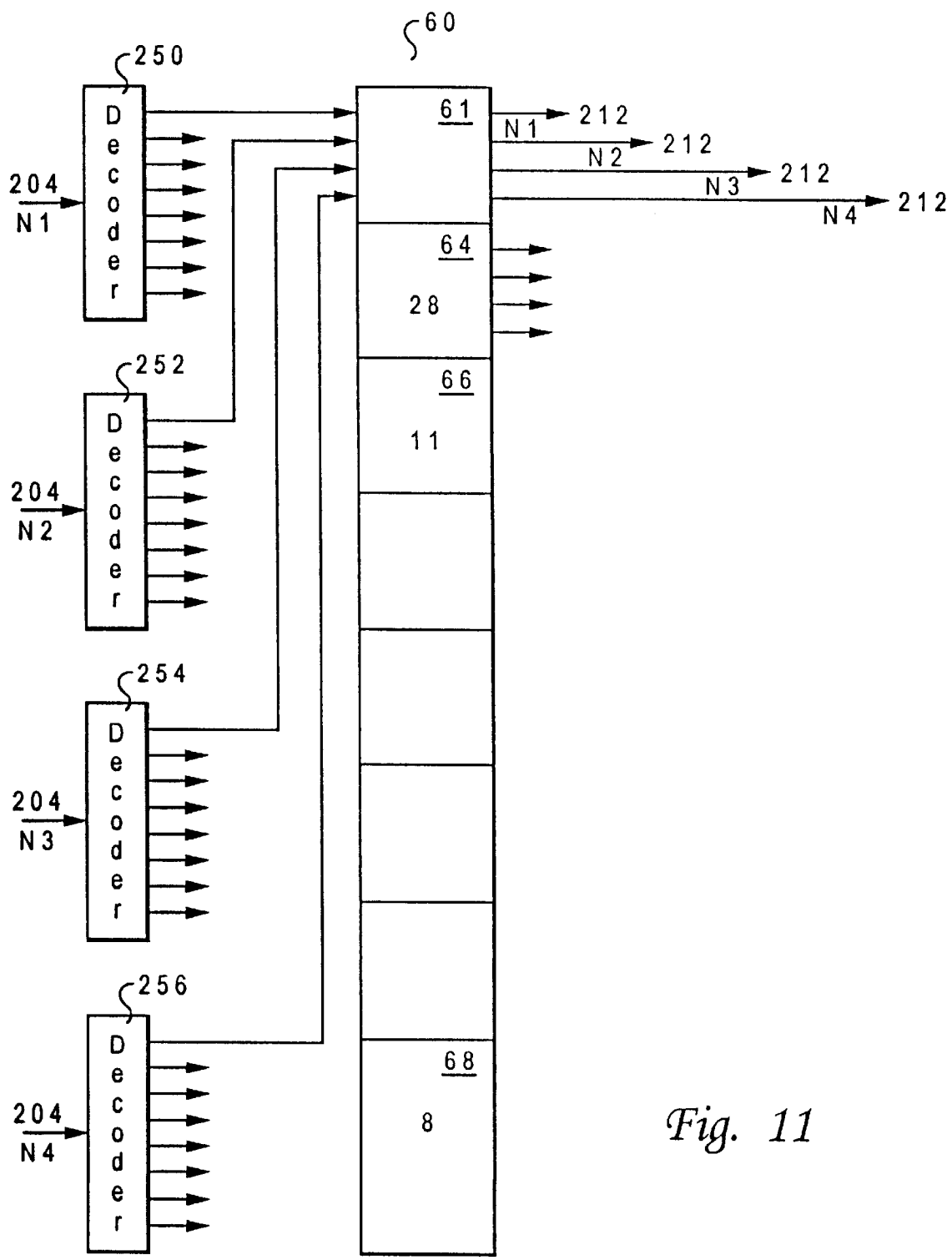
FIG. 11 illustrates a pictorial representation of a table 60 and decoders 250, 252, 254, and 256 utilized to read data from table 60 in accordance with the method and system of the present invention.

FIG. 11 illustrates a pictorial representation of a table 60 and a decoder 250 utilized to read data from table 60 in accordance with the method and system of the present invention. The present invention includes four decoders because four instructions are concurrently processed. If eight instructions were concurrently processed, eight decoders would be necessary. Decoder 250 is associated with the first instruction, N1, to be fetched and decoded. In the example, in the first cycle, instruction 42 is the first instruction and would be associated with decoder 250. Decoder 252 is associated with the second instruction, N2, to be fetched and decoded. In the example, in the first cycle, instruction 44 is the second instruction and would be associated with decoder 252. Decoder 254 is associated with the third instruction, N3, to be fetched and decoded. In the example, in the first cycle, instruction 46 is the third instruction and would be associated with decoder 254. Decoder 256 is associated with the fourth instruction, N4, to be fetched and decoded. In the example, in the first cycle, instruction 48 is the fourth instruction and would be associated with decoder 256.

Decoder 250 has as its input the information associated with field 204 for the special instruction register for the first instruction, N1. In the example, in the first cycle, instruction 44 is associated with special instruction register 220 which includes field 204a. Information included within field 204a is then input into decoder 250. Decoder 252 has as its input the information associated with field 204 for the special instruction register for the second instruction, N2. Decoder 254 has as its input the information associated with field 204 for the special instruction register for the third instruction, N3. Decoder 256 has as its input the information associated with field 204 for the special instruction register for the fourth instruction, N4.

Each decoder has eight outputs. Each output of a decoder is coupled to a different one of the fields of table 60. A decoder will have an output coupled to each of the eight fields of table 60. Therefore, each field of table 60 is coupled to each decoder. FIG. 11 depicts the inputs for only field 61 of table 60. It should be understood that the other fields are coupled to the decoders in a similar manner.

When table 60 is to be read, only the decoder associated with the instruction requiring information from table 60 is utilized. The other decoders are not utilized at that time. The information included within field 204 is input into a decoder in order to cause the decoder to activate the appropriate output from the decoder. For example, for instruction N1, only decoder 250 will be utilized. If the information included within field 204 of the special instruction register associated with instruction N1 is a "2", the output from the decoder which is coupled to field 64 is activated. Therefore, if a logical register name of "2" was input into field 204 for instruction N1, the field 64 of table 60 which is associated with a general register 2 is selected. The information included within field 64 is then output to field 212 into the special instruction register for instruction N1.

If instruction N2 had read table 60, the data included with the appropriate field of table 60 would be output to field 212 associated with the special instruction register associated with instruction N2. If instruction N3 had read table 60, the data included with the appropriate field of table 60 would be output to field 212 associated with the special instruction register associated with instruction N3. And, if instruction N4 had read table 60, the data included with the appropriate field of table 60 would be output to field 212 associated with the special instruction register associated with instruction N4.

FIG. 12 illustrates a pictorial representation of a plurality of compare circuits utilized to compare the logical register names associated with each of the multiple instructions to be concurrently processed in accordance with the method and system of the present invention. Compare circuit 260 compares the logical register names of instructions N1 and N2. The output, C1C2, of compare circuit 260 will indicate whether or not the instructions are each associated with the same logical register name. Compare circuit 262 compares the logical register names of instructions N1 and N3. The output, C1C3, of compare circuit 262 will indicate whether or not the instructions are each associated with the same logical register name. Compare circuit 264 compares the logical register names of instructions N2 and N3. The output, C2C3, of compare circuit 264 will indicate whether or not the instructions are each associated with the same logical register name. Compare circuit 266 compares the logical register names of instructions N1 and N4. The output, C1C4, of compare circuit 266 will indicate whether or not the instructions are each associated with the same logical register name. Compare circuit 268 compares the logical register names of instructions N2 and N4. The output, C2C4, of compare circuit 268 will indicate whether or not the instructions are each associated with the same logical register name. Compare circuit 270 compares the logical register names of instructions N3 and N4. The output, C3C4, of compare circuit 270 will indicate whether or not the instructions are each associated with the same logical register name.

FIG. 13 depicts a pictorial representation of a plurality of circuits utilized to be utilized during an updating of tables 60 and 62 in accordance with the method and system of the present invention. Outputs C1C2, C1C3, C1C4, C2C3, C2C4, and C3C4 are received from the circuits of FIG. 12 and utilized to generate a plurality of blocking signals. The blocking signals are utilized during an updating of either table 60 or 62. When BLOCK PIPE 1 is active, it indicates that the physical register associated with instruction N1 is not to be used during an update to the table. The physical register associated with instruction 1 is free to be associated with a new instruction when BLOCK PIPE 1 is active when an update to table 62 is made. When BLOCK PIPE 2 is active, it indicates that the physical register associated with instruction N2 is not to be used during an update to the table, and that the physical register is now free to be reassigned when an update to table 62 is made. When BLOCK PIPE 3 is active, it indicates that the physical register associated with instruction N3 is not to be used during an update to the table, and that the physical register is now free to be reassigned when an update to table 62 is made.

An ALLOCATE 2 signal is input into AND gate 280 along with C1C2. ALLOCATE 2 is received from the allocation field of the special instruction register for instruction N2. ALLOCATE 2 is a logical one when instruction N2 is a LOAD register instruction. An ALLOCATE 3 signal is input into AND gate 282 along with C1C3. ALLOCATE 3 is received from the allocation field of the special instruction register for instruction N3 and is a logical one when instruction N3 is a LOAD register instruction. An ALLOCATE 4 signal is input into AND gate 284 along with C1C4. ALLOCATE 4 is received from the allocation field of the special instruction register for instruction N4 and is a logical one when instruction N4 is a LOAD register instruction. AND gates 280, 282, and 284 each generate an output which is received by OR gate 292. OR gate 292 generates a BLOCK PIPE 1 signal.

ALLOCATE 3 is input into AND gate 286 along with C2C3. ALLOCATE 4 is input into AND gate 288 along with C2C4. AND gates 286 and 288 each generate an output which is received by OR gate 294. OR gate 294 generates a BLOCK PIPE 2 signal. ALLOCATE 4 is input into AND gate 290 along with C3C4. AND gate 290 generates a BLOCK PIPE 3 signal.

FIG. 14 depicts a pictorial representation of a plurality of circuits to be utilized during an updating of tables 60 and 62 in accordance with the method and system of the present invention. Decoders 250, 252, 254, and 256 are utilized in a same such as described in FIG. 11 in order to select a particular field of table 60 for an instruction. Gate 300 is associated with instruction N1. Gate 302 is associated with instruction N2. Gate 304 is associated with instruction N3. And, gate 306 is associated with instruction N4. When decoder 250 is utilized, decoders 252, 254, and 256 will not be utilized. Decoder 250 will enable only gate 300. In a similar manner, when decoder 252 is utilized, decoders 250, 254, and 256 will not be utilized. Decoder 252 will enable only gate 302. When decoder 254 is utilized, decoders 250, 252, and 256 will not be utilized. Decoder 254 will enable only gate 304. And, when decoder 256 is utilized, decoders 250, 252, and 254 will not be utilized. Decoder 256 will enable only gate 306. For example, if instruction N1 is being processed and it is associated with a logical register name of "2", decoder 250 will be utilized to enable gate 300 to select field 64 for updating.

Gate 300 receives as its inputs the ALLOCATE 1 signal, a logically inverted BLOCK PIPE 1 signal, and the information which is stored in field 212 of the special instruction register associated with instruction N1. The information stored in field 212 will include an address for a physical register associated with instruction N1.

Gate 302 receives as its inputs the ALLOCATE 2 signal, a logically inverted BLOCK PIPE 2 signal, and the information which is stored in field 212 of the special instruction register associated with instruction N2. The information stored in field 212 will include an address for a physical register associated with instruction N2.

Gate 304 receives as its inputs the ALLOCATE 3 signal, a logically inverted BLOCK PIPE 3 signal, and the information which is stored in field 212 of the special instruction register associated with instruction N3. The information stored in field 212 will include an address for a physical register associated with instruction N3.

Gate 306 receives as its inputs the ALLOCATE 4 signal, and the information which is stored in field 212 of the special instruction register associated with instruction N4. The information stored in field 212 will include an address for a physical register associated with instruction N4.

The output of one of the gates 300, 302, 304, or 306 will be received in the field selected by decoders 250, 252, 254, or 256.

While a preferred embodiment has been particularly shown and described, it will be understood by those skilled in the art that various changes in form and detail may be made therein without departing from the spirit and scope of the present invention.

We claim:

1. A method in a superscalar data processing system for managing a plurality of physical registers, said data processing system including multiple instructions to be processed during a single clock cycle, said method comprising the steps of:

establishing said plurality of physical registers within said system, wherein none of said plurality of physical registers are designated as one of a plurality of general registers prior to said multiple instructions being allocated, and further wherein none of said plurality of general registers are designated prior to said multiple instructions being allocated;

for each of said multiple instructions, determining if said each of said multiple instructions is a load register instruction;

in response to an allocation of said each of said multiple instructions being a load register instruction, determining if said each of said multiple instructions is associated with at least one of said plurality of general registers;

in response to said each of said multiple instructions being associated with said at least one of said plurality of general registers, temporarily designating one of said plurality of physical registers as said one of said plurality of general registers, wherein said one of said plurality of physical registers is temporarily utilized as said particular one of said plurality of general registers;

establishing a different special instruction register for each of said multiple instructions;

establishing a plurality of fields within said special instruction register including a physical register field;

for each of said multiple instructions being a load register, storing an indication of said temporarily designated one of said physical registers in said physical register field;

designating one of said Plurality of fields within said special instruction register as an allocation field;

determining if said each of said multiple instructions for which said special instruction register is established is a load register instruction;

in response to a determination that said each of said multiple instructions for which said special instruction register is established is a load register instruction, storing a first indicator in said allocation field; and in response to a determination that said each of said multiple instructions for which said special instruction register is established is not a load register instruction, storing a second indicator in said allocation field.

2. The method according to claim 1, further comprising the steps of:

maintaining said indication of said temporary designation only in said special instruction register during processing of each of said multiple instructions; and storing said indication of said temporary designation in an execution table only in response to a completion of processing of each of said multiple instructions.

3. The method according to claim 2 further comprising the steps of:

establishing an allocation table;

establishing a plurality of fields within said allocation table, each of said plurality of fields being associated with a different one of said plurality of general registers; and updating said allocation table upon completion of an allocation of said multiple instructions by, for each said special instruction register including said first indicator stored in said allocation field, storing said indication of said one of said plurality of physical registers associated with said each of said multiple instructions which is associated with said special instruction register in said one of said plurality of fields within said allocation table, wherein said one of said plurality of physical registers indicated in said one of said plurality of fields in said allocation table is temporarily utilized as said one of said plurality of general registers.

4. The method according to claim 3, further comprising the steps of:

establishing said execution table;

establishing a plurality of fields within said execution table, each of said plurality of fields being associated with a different one of said plurality of general registers; and updating said execution table upon completion of processing of said multiple instructions by, for each said special instruction register including said first indicator stored in said allocation field, storing said indication of said one of said plurality of physical registers associated with said each of said multiple instructions which is associated with said special instruction register in said one of said plurality of fields within said execution table, wherein said one of said plurality of physical registers indicated in said one of said plurality of fields in said execution table is temporarily utilized as said one of said plurality of general registers.

5. A superscalar data processing system for managing a plurality of physical registers, said data processing system including multiple instructions to be processed during a single clock cycle, comprising:

means for establishing said plurality of physical registers within said system, wherein none of said plurality of physical registers are designated as one of a plurality of general registers prior to said multiple instructions being allocated, and further wherein none of said plurality of general registers are designated prior to said multiple instructions being allocated;

means for each of said multiple instructions, for determining if said each of said multiple instructions is a load register instruction;

means responsive to an allocation of said each of said multiple instructions being a load register instruction, for determining if said each of said multiple instructions is associated with at least one of said plurality of general registers;

means responsive to said each of said multiple instructions being associated with said at least one of said plurality of general registers, for temporarily designating one of said plurality of physical registers as said one of said plurality of general registers, wherein said one of said plurality of physical registers is temporarily utilized as said particular one of said plurality of general registers;

means for establishing a different special instruction register for each of said multiple instructions;

means for establishing a plurality of fields within said special instruction register including a physical register field;

for each of said multiple instructions being a load register, storing an indication of said temporarily designation of said physical registers in said physical register field;

means for designating one of said plurality of fields within said special instruction register as an allocation field;

means for determining if said each of said multiple instructions for which said special instruction register is established is a load register instruction;

means responsive to a determination that said each of said multiple instructions for which said special instruction register is established is a load register instruction, for storing a first indicator in said allocation field; and means responsive to a determination that said each of said multiple instructions for which said special instruction register is established is not a load register instruction, for storing a second indicator in said allocation field.

6. The system according to claim 5, further comprising:

means for maintaining said indication of said temporary designation only in said special instruction register during processing of each of said multiple instructions; and means for storing said indication of said temporary designation in an execution table only in response to a completion of processing of each of said multiple instructions.

7. The system according to claim 6 further comprising:

means for establishing an allocation table;

means for establishing a plurality of fields within said allocation table, each of said plurality of fields being associated with a different one of said plurality of general registers; and means for updating said allocation table upon completion of an allocation of said multiple instructions by, each said special instruction register including said first indicator stored in said allocation field, for storing said indication of said one of said plurality of physical registers associated with said each of said multiple instructions which is associated with said special instruction register in said one of said plurality of fields within said allocation table, wherein said one of said plurality of physical registers indicated in said one of said plurality of fields in said allocation table.

8. The system according to claim 7, further comprising:

means for establishing said execution table;

means for establishing a plurality of fields within said execution table, each of said plurality of fields being associated with a different one of said plurality of general registers; and means for updating said execution table upon completion of processing of said multiple instructions by, for each said special instruction register including said first indicator stored in said allocation field, storing said indication of said one of said plurality of physical registers associated with said each of said multiple instructions which is associated with said special instruction register in said one of said plurality of fields within said execution table, wherein said one of said plurality of physical registers indicated in said one of said plurality of fields in said execution table is temporarily utilized as said one of said plurality of general registers.

* * * * *